United States Patent [19]
Aitta et al.

[11] Patent Number: 5,898,065
[45] Date of Patent: Apr. 27, 1999

[54] NEUTRALIZATION OF TALL OIL SOAP

[75] Inventors: Eero Aitta, Jokirinne; Elias Varila, Jääli, both of Finland

[73] Assignee: L'Air Liquide, Societe Anonyme pour l'Etude et l'Exploitation des Procedes Georges Claude, Paris, France

[21] Appl. No.: 08/952,310

[22] PCT Filed: May 3, 1996

[86] PCT No.: PCT/FI96/00243

§ 371 Date: Jan. 26, 1998

§ 102(e) Date: Jan. 26, 1998

[87] PCT Pub. No.: WO96/34932

PCT Pub. Date: Nov. 7, 1996

[30] Foreign Application Priority Data

May 5, 1995 [FI] Finland ................................. 952176

[51] Int. Cl.⁶ ............................ C09F 1/001; C11B 13/02
[52] U.S. Cl. ...................... 530/205; 530/206; 530/208
[58] Field of Search ................................ 530/205, 206, 530/208

[56] References Cited

U.S. PATENT DOCUMENTS

| | | |
|---|---|---|
| 3,901,869 | 8/1975 | Bills . |
| 5,283,319 | 2/1994 | Huibers et al. . |
| 5,286,845 | 2/1994 | Huibers et al. ........................ 530/208 |
| 5,455,328 | 10/1995 | Vuorikari et al. ...................... 530/230 |

FOREIGN PATENT DOCUMENTS

| | | |
|---|---|---|
| 93868 | 6/1992 | Finland . |
| 98166 | 2/1940 | Sweden . |
| WO93/23132 | 11/1993 | WIPO . |
| WO94/11571 | 5/1994 | WIPO . |
| WO95/23837 | 9/1995 | WIPO . |

OTHER PUBLICATIONS

TkT Raimo Alén, "Sulfaattikeitossa sivutuotteina syntyvien alifaattisten karboksyylihappojen hyödyntäminen", *Kemia–Kemi*, vol. 15 (1988) 6, pp. 565–569.

V.C. Uloth et al, "Crude Spent Sulphite Liquor as Soap Acidulation Additives to Improve Efficiency of Tall Oil Production," *Pulp & Paper Canada,* 85:5 (1984), pp. 69–71.

*Primary Examiner*—Nathan M. Nutter
*Attorney, Agent, or Firm*—Burns, Doane, Swecker & Mathis, L.L.P.

[57] ABSTRACT

The invention relates to a method for improving the separation of water in a tall oil preparation process which comprises: a neutralization step, in which a mixture of tall oil soap and water is neutralized with carbon dioxide; a water separation step, in which the aqueous phase containing bicarbonate is separated from the tall oil soap; and a cooking step, in which the tall oil soap obtained from the previous step is cooked with sulfuric acid in order to form tall oil, the improvement comprising the fact that, after the neutralization with carbon dioxide but before the water separation step, the pH is adjusted with an acidically reacting substance, such as bisulfite. The invention also relates to a method for the preparation of tall oil, the method comprising the steps stated above.

12 Claims, 1 Drawing Sheet

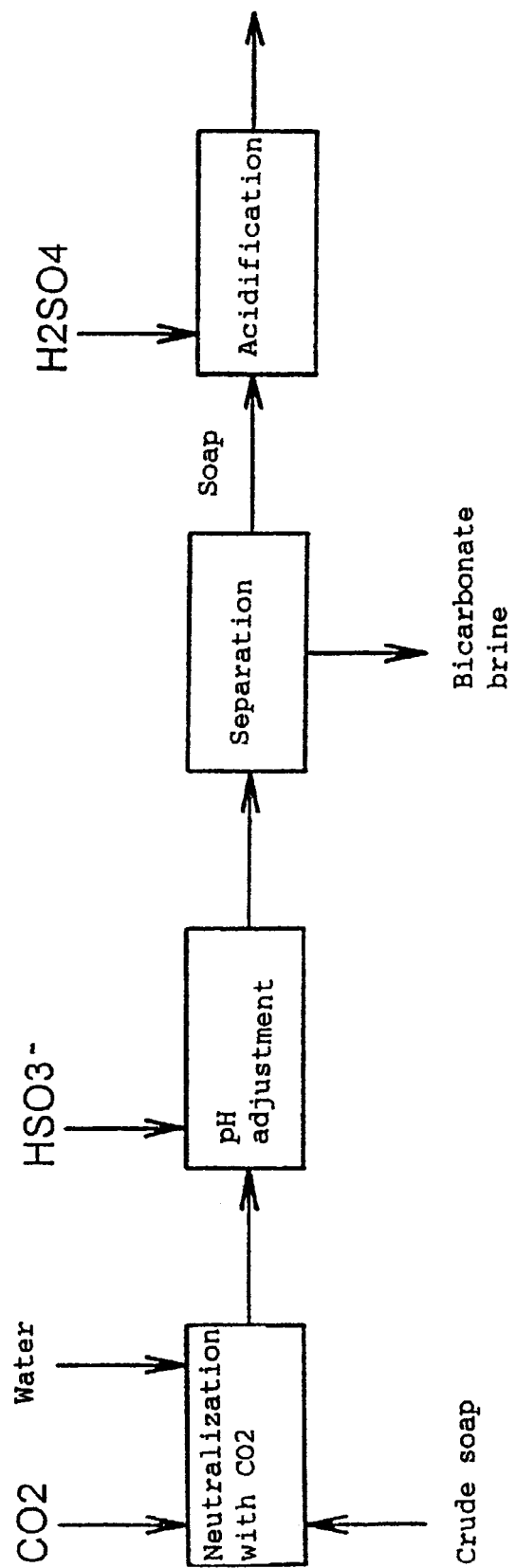

NEUTRALIZATION OF TALL OIL SOAP

This application is a continuation filed under 35 USC 371 of PCT/FI 96/00243 filed May 3,1996

The object of the present invention is a method for improving the separation of water in a tall oil preparation process comprising a neutralization step in which a mixture of tall oil soap and water is neutralized with carbon dioxide, a water separation step in which the aqueous phase containing bicarbonate is separated from the tall oil soap, and a cooking step in which the soap obtained from the preceding step is cooked with sulfuric acid to form tall oil. The invention also relates to a method for the preparation of tall oil, the method comprising the steps stated above.

In the alkaline digestion of softwood or hardwood, especially in the sulfate process, so-called black liquor is formed which contains crude tall oil soap, hereinafter called crude soap. This crude soap can be decomposed with sulfuric acid to form crude tall oil.

A tall oil preparation process of the type stated in the beginning of the present specification, based on carbon dioxide neutralization, is known from U.S. Pat. No. 3,901,869. In the first step of this known process, a neutralization with carbon dioxide is carried out. After this step, water is separated, and finally a tall oil cook with sulfuric acid is performed.

When crude soap is treated with carbon dioxide, the carbon dioxide dissolves in the soap-water emulsion, and the formed carbonic acid neutralizes the soap and the lye accompanying it. The neutralization lowers the pH of the soap-water mixture to a range of 7.5–8.2.

In terms of the separation of the inorganic phase and the organic phase, the pH should be lowered by 0.2–1.0 unit, but without using an excess of carbon dioxide, which would result in effervescence. In terms of the economy of the process, a maximally high efficiency of the use of carbon dioxide is a key factor.

A problem in the state-of-the-art technology is thus poor separation of water. Poor separation of water results in that too much sulfuric acid is consumed in the further cook and the excess water unnecessarily expands the process cycles. The excess $CO_2$-containing water also causes effervescence in the cook with sulfuric acid, since bicarbonate decomposes during the cook.

The applicant's previous patent application FI-940969 discloses a method in which a second neutralization with an addition of $H_2SO_4$ is carried out after the neutralization with carbon dioxide. By this procedure it was possible to improve the separation of tall oil soap in the water separation step as compared with a method in which an intermediate neutralization with sulfuric acid was not carried out. However, this method still has the deficiency that the separation water is not completely sufficient.

An object of the invention is a method by means of which the separation of an aqueous phase containing bicarbonate in the water separation step following the neutralization with $CO_2$ can be improved.

The principal characteristics of the invention are given in the accompanying claims.

In accordance with the invention, after the neutralization with carbon dioxide but before the water separation step, the pH is thus adjusted using an acidically reacting substance, provided, however, that this substance is not sulfuric acid alone. Thereby the separation of water is considerably improved as compared with a method in which such pH adjustment is not carried out, and is improved even as compared with a method in which intermediate neutralization with only sulfuric acid is carried out.

With an addition of an acidically reacting substance, the pH is lowered by approx. 0.2–1 pH unit, to an optimum pH range of approx. 7.0–8.0. The adding is done according to the pH.

When carried out in excess, pH adjustment releases an excess of fatty acids, in which case the fatty acids will act as emulsifiers, and tall oil soap will become slurried in the mother liquor.

Suitable acidically reacting substances include bisulfite, sulfur dioxide, hydrochloric acid, nitric acid, and carboxylic acids such as formic acid, as well as mixtures thereof. The acidically reacting substance used may also be a pulp industry waste acid, which contains acidic cooking chemicals in addition to sulfuric acid.

Especially preferable acidically reacting substances include bisulfite-containing solutions, and sulfur dioxide. If $SO_2$ gas is used for pH adjustment, the sulfur dioxide will dissolve in water and form sulfurous acid, which will neutralize tall oil soap.

The bisulfite-containing solution used may preferably be a waste solution formed in the additional scrubbing of sulfurcontaining flue gases of a pulp mill; the solution contains, in addition to sodium bisulfite ($NaHSO_3$), also sodium sulfite ($Na_2SO_3$). Although sodium bisulfite does act as an ingredient giving acidity, sodium sulfite also promotes the separation of water by increasing the density of the aqueous phase.

According to the invention it has been observed, surprisingly, that, if a solution which contains bisulfite ($HSO_3^-$) is used for pH adjustment after the neutralization with $CO_2$, the separation of water is improved considerably as compared with a method in which the intermediate neutralization is carried out using only sulfuric acid.

The acidically reacting substance releases some carbon dioxide which, after adhering to the surface of the tall oil soap, will promote the separation of soap by increasing the density difference between the two separating phases. Furthermore, the adjustment of the pH to the optimum range will release oily resin acids from the tall oil soap, whereby the surface of the soap becomes water-repellent, a factor which improves the separation of the phases. By using the method according to the invention, a drier tall oil soap is obtained for the final separation of tall oil. Furthermore, the water content of the crude tall oil obtained from the cook is lower and its acid number higher. Unreacted tall oil soap is not left in the oil.

The adding of the acidically reacting substance in solution form is done into a non-pressurized reactor which is located at a point after the carbon dioxide neutralization reactor or reactors, but before the separation vessel. The adding of a gaseous acidically reacting substance, such as sulfur dioxide, can be done under normal pressure or elevated pressure.

The neutralization with $CO_2$ can be performed under normal pressure or elevated pressure. The carbon dioxide used is preferably gaseous carbon dioxide.

The invention is described below in greater detail with reference to the accompanying drawing, which shows a block diagram of one process according to the invention for the preparation of tall oil.

Crude soap and water are pumped into the $CO_2$ neutralization reactor, and gaseous $CO_2$ is fed into it in order to neutralize the mixture. The soap-water mixture is introduced into a pH adjustment reactor, into which a bisulfite-containing solution, such as a sodium bisulfite/sodium sulfite solution, is introduced for further neutralization of the soap-water mixture. Thereafter the mixture is fed into a separation vessel, in which the bicarbonate brine is separated from the soap. Finally the tall oil soap is fed into the tall oil cooker, in which acidification with sulfuric acid is performed, whereby crude tall oil is obtained.

EXAMPLE 1

A crude soap which contained 70% hardwood soap and 30% softwood soap was preneutralized with carbon dioxide. In the pre-neutralization the pH of the soap was dropped from 11.7 to 8.2. Thereafter the mixture of soap and water was divided into two aliquots; the pH of one (Experiment 1A, in accordance with the invention) was adjusted with a sodium bisulfite/sodium sulfite solution, and the pH of the other (comparative experiment 1B) was adjusted with a 95% sulfuric acid.

EXPERIMENT 1A

The pH of the soap was adjusted with a sodium bisulfite/sodium sulfite solution from a pH value of 8.2 to a pH value of 7.9. 208 g of water separated from the soap/water mixture, which amounted to 350 g. The water content of the separated soap was 50.8%. The soap was cooked to form tall oil, which had a water content of 1.7%, an acid number of 154, and a saponification number of 0 mg KOH/g.

EXPERIMENT 1B

The pH of the soap was adjusted with a 95% sulfuric acid from a pH value of 8.2 to a pH value of 7.8. 150 g of water separated from the water/soap mixture, which amounted to 350 g. The water content of the separated soap was 67.5%. The soap was cooked to form tall oil, which had a water content of 4.7%, an acid number of 154, and a saponification number of 0.6 mg KOH/g.

EXAMPLE 2

In this example, a soap/water mixture was preneutralized in an autoclave by using carbon dioxide under a pressure of 8 bar and a temperature of 50° C. During the experiment the pH was dropped to a level below 8.5. The soap/water mixture (70% water) obtained from the experiment was divided into two aliquots; the pH of one (Experiment 2A, in accordance with the invention) was adjusted with formic acid, and the pH of the other (comparative Experiment 2B) was adjusted with concentrated sulfuric acid.

EXPERIMENT 2A

The pH of the soap was adjusted with an 80% formic acid (28 g) from a pH value of 8.1 to a pH value of 7.1. After the pH adjustment, the soap and water phases were allowed to separate from each other. 884 g of water separated from the soap/water mixture, which amounted to 1750 g. The water content of the separated soap was 39.4%.

EXPERIMENT 2B

The pH of the soap was adjusted with a 95% sulfuric acid (16 g) from a pH value of 8.4 to a pH value of 7.3. After the pH adjustment, the soap and water phases were allowed to separate from each other. 607 g of water separated from the soap/water mixture, which amounted to 1641 g. The water content of the separated soap was 52.5%.

EXAMPLE 3 pH adjustment was performed using a pulp industry waste acid which contained sulfuric acid approx. 30%. In addition it contained, among other things, sodium sulfate and other acidic cooking chemicals. After the pH adjustment, the soap and water phases separated well, and a soap was obtained having a water content of only approx. 40%. Thus the acidic chemicals which were present in addition to sulfuric acid improved the separation of water as compared with sulfuric acid alone.

The results presented above show that a pH adjustment according to the invention with a sodium bisulfite/sodium sulfite solution, formic acid or other acidic chemicals improves water separation considerably as compared with a case in which sulfuric acid is used. Thus pH adjustment according to the invention removed considerably more water. The same can be seen in the water content of the tall oil obtained from the tall oil cook.

We claim:

1. A method for improving the separation of water in a tall oil preparation process, the method comprising the steps of:
    neutralizing with carbon dioxide a mixture of tall oil soap and water;
    adjusting the pH of the neutralized mixture by adding to the neutralized mixture an acidically reacting substance, provided that the acidically reacting substance is not sulfuric acid alone; and
    separating the aqueous phase containing bicarbonate from the tall oil soap after the pH adjusting step.

2. A method according to claim 1, wherein the acidically reacting substance is bisulfite, sulfur dioxide, hydrochloric acid, nitric acid, or a carboxylic acid.

3. A method according to claim 1, wherein the acidically reacting substance is formic acid.

4. A method according to claim 1 or 2, wherein the acidically reacting substance is a solution comprising sulfite and bisulfite.

5. A method according to claim 1 or 2, wherein the step of adjusting the pH results in the neutralized mixture having a pH of from 7.0 to 8.0.

6. A method according to claim 1 or 2, Wherein the step of adjusting the pH results in a lowering of the pH of the neutralized mixture by from 0.2 to 1 pH unit.

7. A method for preparing tall oil, comprising the steps of:
    neutralizing with carbon dioxide a mixture of tall oil soap and water;
    adjusting the pH of the neutralized mixture by adding to the neutralized mixture an acidically reacting substance, provided that the acidically reacting substance is not sulfuric acid alone;
    separating the aqueous phase containing bicarbonate from the tall oil soap after the pH adjusting step; and
    cooking the separated tall oil soap with sulfuric acid to form tall oil.

8. A method according to claim 7, wherein the acidically reacting substance is bisulfite, sulfur dioxide, hydrochloric acid, nitric acid, or a carboxylic acid.

9. A method according to claim 7, wherein the acidically reacting substance is formic acid.

10. A method according to claim 7 or 8, wherein the acidically reacting substance is a solution comprising sulfite and bisulfite.

11. A method according to claim 7 or 8, wherein the step of adjusting the pH results in the neutralized mixture having a pH of from 7.0 to 8.0.

12. A method according to claim 7 or 8, Wherein the step of adjusting the pH results in a lowering of the pH of the neutralized mixture by from 0.2 to 1 pH unit.

\* \* \* \* \*